United States Patent
Rangaiah

(10) Patent No.: US 8,880,934 B2
(45) Date of Patent: Nov. 4, 2014

(54) METHOD AND SYSTEM FOR CO-EXISTENCE OF LIVE MIGRATION PROTOCOLS AND CLUSTER SERVER FAILOVER PROTOCOLS

(75) Inventor: Jagadamba Rangaiah, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 269 days.

(21) Appl. No.: 13/439,684

(22) Filed: Apr. 4, 2012

(65) Prior Publication Data

US 2013/0268800 A1 Oct. 10, 2013

(51) Int. Cl.
*G06F 11/00* (2006.01)

(52) U.S. Cl.
USPC .................. 714/4.11; 714/13; 718/1

(58) Field of Classification Search
CPC ............ G06F 9/45533; G06F 9/45558; G06F 9/5077; G06F 11/1482; G06F 11/1484; G06F 11/2023; G06F 11/203; G06F 11/2046
USPC .................. 714/4.1, 4.11, 6.1, 6.11, 6.2, 6.3, 714/10–13; 718/1
See application file for complete search history.

(56) References Cited

U.S. PATENT DOCUMENTS

| | | | |
|---|---|---|---|
| 6,772,161 B2 * | 8/2004 | Mahalingam et al. ................ | 1/1 |
| 7,213,246 B1 * | 5/2007 | van Rietschote et al. ......... | 718/1 |
| 7,634,595 B1 * | 12/2009 | Brown et al. .................... | 710/38 |
| 7,814,363 B2 * | 10/2010 | Hatta et al. ........................ | 714/3 |
| 7,984,108 B2 | 7/2011 | Landis et al. | |
| 8,090,908 B1 * | 1/2012 | Bolen et al. .................... | 711/114 |
| 2002/0064149 A1 | 5/2002 | Elliott et al. | |
| 2011/0125979 A1 * | 5/2011 | Kancharla et al. ............ | 711/162 |
| 2012/0246642 A1 * | 9/2012 | Pafumi et al. ..................... | 718/1 |

OTHER PUBLICATIONS

Irving, Nic; Jenner, Mathew; and Kortesniemi, Arsi; "Partitioning Implementations for IBM eServer p5 Servers;" ibm.com/redbooks; Feb. 2005.*
International Search Report corresponding to PCT/US2013/035308, dated Aug. 2, 2013, 3 pages.

* cited by examiner

*Primary Examiner* — Scott Baderman
*Assistant Examiner* — Joseph Kudirka
(74) *Attorney, Agent, or Firm* — Wilmer Cutler Pickering Hale and Dorr LLP

(57) ABSTRACT

A method and system for logical partition (LPAR) migration including creating a profile for a logical partition on a host system comprising one or more LPARs, wherein the profile is associated with a first name. Also, within the profile, a port of a client virtual small computer system interface (SCSI) adapter of the LPAR is mapped to a port of a server virtual SCSI adapter of a virtual input/output server (VIOS) of the host system. The server port of the VIOS is set to accept any port of virtual client SCSI adapters of the one or more LPARs of the host system. Within the VIOS, the server port of the VIOS is mapped to a device name (i.e., LPAR) and to a target device (i.e., a disk of shared storage), for purposes of proper failover implementation of the LPAR, wherein the target device comprises an operating system for the LPAR.

20 Claims, 7 Drawing Sheets

METHOD AND SYSTEM FOR CO-EXISTENCE OF LIVE MIGRATION PROTOCOLS AND CLUSTER SERVER FAILOVER PROTOCOLS

BACKGROUND

A logical partition of computing resources (LPAR) is virtualized as a separate virtual machine, in a IBM AIX environment. The computing resource may be partitioned into one or more LPARs, wherein one or more virtual machines are running under a single physical, computing resource. Additionally, other computing resources may also support one or more LPARs, such that another computing resource may support one or more virtual machines. As such, a network of computing resources may include multiple LPARs.

Additionally, a particular LPAR of a first physical, computing resource may be migrated to a second computing resource to maintain operability of applications and services provided by the migrated LPAR. In particular, both the first and second computing resources cooperate with each other to migrate the LPAR from the first computing resource to the second computing resource. For example, in a typical scenario in which migration is implemented, the first computing resource may be scheduled for maintenance. As such, to maintain continuity of applications running on the LPAR, that LPAR can be migrated to the second computing resource.

However, when a LPAR migrates from the first computing resource to the second computing resource using a migration protocol, the profile of the LPAR and the underlying disk mappings are deleted from the first or source computing resource. This deletion of information may deleteriously affect other features and services involving LPARs. For instance, failover protocols may rely on the deleted information and may be rendered ineffective. As a result, lack of compatibility between migration and failover (and/or other protocols) protocols will prevent application availability and mobility in cloud environments.

SUMMARY

Systems and methods for LPAR migration that are compatible with cluster management failover protocols, such as Veritas Cluster Server (VCS). The method includes creating a profile for a logical partition on a host system comprising one or more LPARs, wherein the profile is associated with a first name. The method also includes mapping, within the profile, a client port of a virtual small computer system interface (SCSI) adapter of the LPAR to a server port of a virtual SCSI adapter of a virtual input/output server (VIOS) of the host system. The method includes setting the server port of the VIOS to accept any port of virtual SCSI adapters of the one or more LPARS of the host system. The method also includes mapping, within the VIOS, the server port of the VIOS to a device name (i.e., LPAR) and to the target device (i.e., to a disk of shared storage) for purposes of proper failover implementation of the LPAR, wherein the target device comprises an operating system for the LPAR.

In some embodiments, a system includes a tangible, non-transitory computer-readable storage medium having stored thereon, computer-executable instructions that, when executed causes the computer system to perform a method for LPAR migration that is compatible with cluster management failover protocols. The method includes creating a profile for a logical partition on a host system comprising one or more LPARs, wherein the profile is associated with a first name. The method also includes, within the profile, mapping a client port of a virtual SCSI adapter of the LPAR to a server port of a virtual SCSI adapter of a VIOS of the host system. The method also includes setting the server port of the VIOS to accept any port of virtual SCSI adapters of the one or more LPARS of the host system. Also, within the VIOS, the method includes mapping the server port of the VIOS to a device name (i.e., the LPAR) and to a target device (i.e., a disk of shared storage) for purposes of proper failover implementation of the LPAR, wherein the target device comprises an operating system for the LPAR.

In one embodiment, a computer system comprises a processor coupled to memory having stored therein instructions that, if executed by the computer system, cause the computer to execute a method for LPAR migration that is compatible with cluster management failover protocols. The method includes creating a profile for a logical partition on a host system comprising one or more LPARs, wherein the profile is associated with a first name. The method also includes, within the profile, mapping a client port of a virtual SCSI adapter of the LPAR to a server port of a virtual SCSI adapter of a VIOS of the host system. The method also includes setting the server port of the VIOS to accept any port of virtual SCSI adapters of the one or more LPARS of the host system. Also, within the VIOS, the method includes mapping the server port of the VIOS to a device name (i.e., the LPAR) and to a target device (i.e., a disk of shared storage) for purposes of proper failover implementation of the LPAR, wherein the disk comprises an operating system for the LPAR Thus, according to embodiments of the present disclosure, an LPAR failover feature provided by cluster server protocols, such as Veritas Cluster Server (VCS) coexists with migration protocols, such as those provided by International Business Machines (IBM) Live Partition Mobility (LPM) services, to make applications and LPARs highly available even when encountering unforeseen failures on a computing resource.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
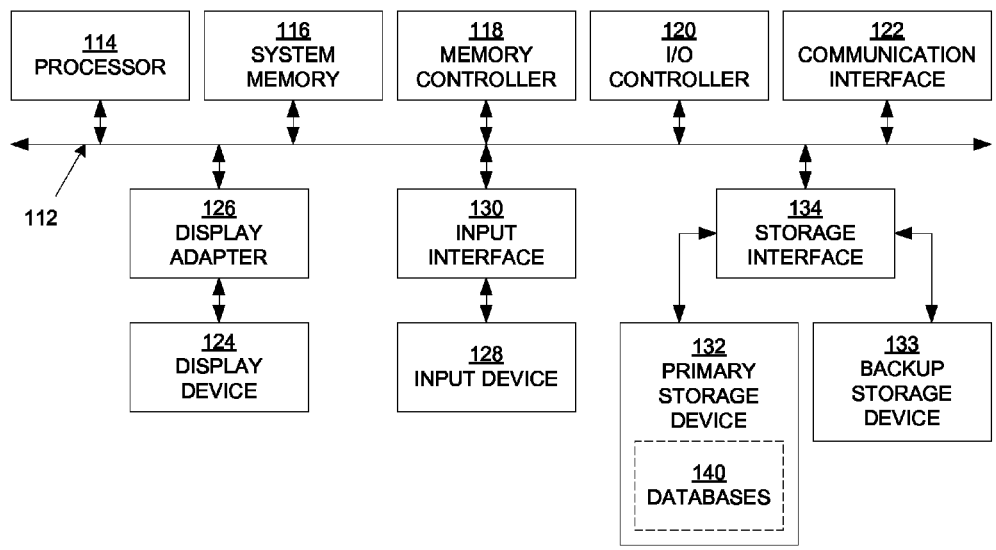
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "creating," "determining," "mapping," "setting," or the like, refer to actions and processes (e.g., flowchart 5 of FIG. 5) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
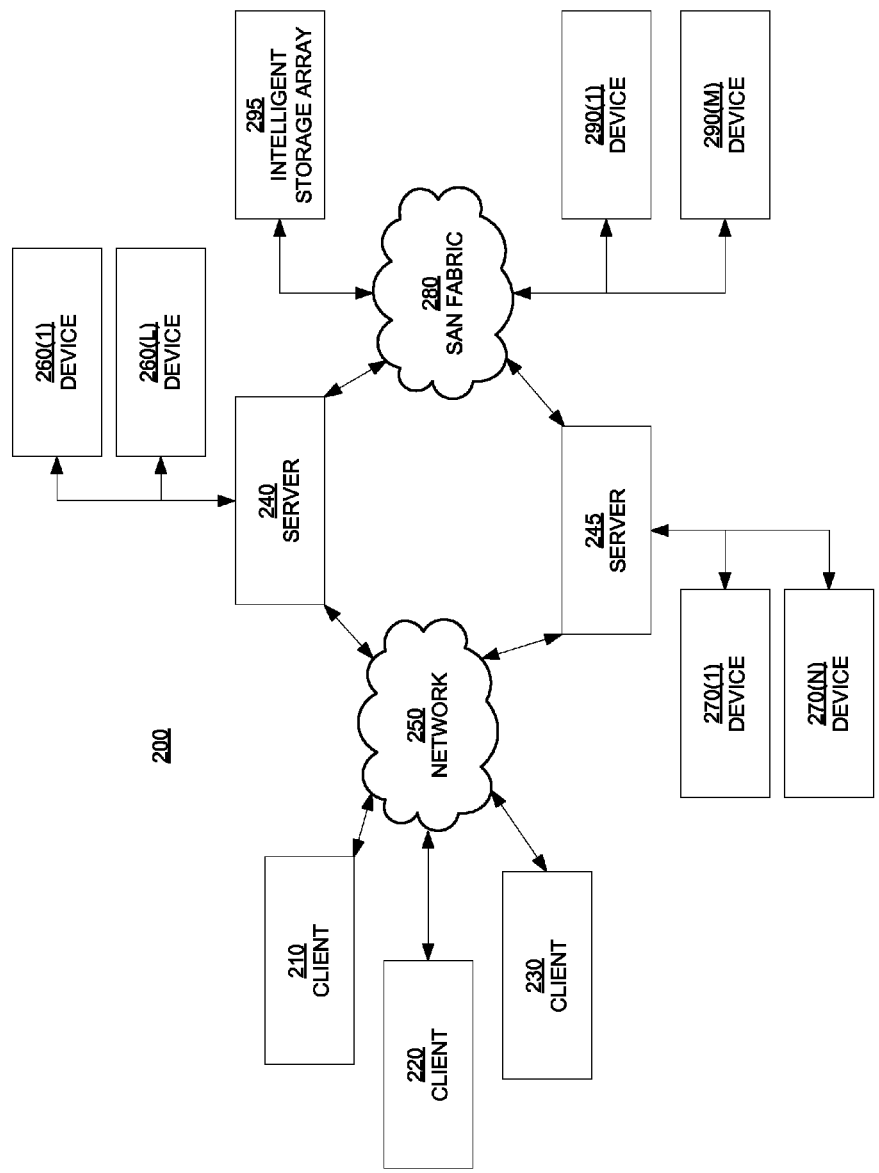
FIG. 2 is a block diagram depicting a network architecture in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1. In one embodiment, clients run on the server system, and wherein the server may include traffic direction functionality that performs load balancing.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate the implementation of a migration sequence used to migrate an LPAR from a first host system to a second host system that is compatible with failover protocols, wherein a failure in the migrated LPAR on the second host system is available for operation back on the first host system. Other embodiments of the present disclosure provide the above advantages, and further provide for an application running on a virtual LPAR to be highly available on multiple host systems, especially when the LPAR is migrated from a first host system to a second host system. Still other embodiments of the present disclosure provide the above advantages, and further provide for minimizing the downtime of a host system after migration of a virtual LPAR in order to re-initialize its configuration to provide for cluster wide availability of applications.

Figure 3:
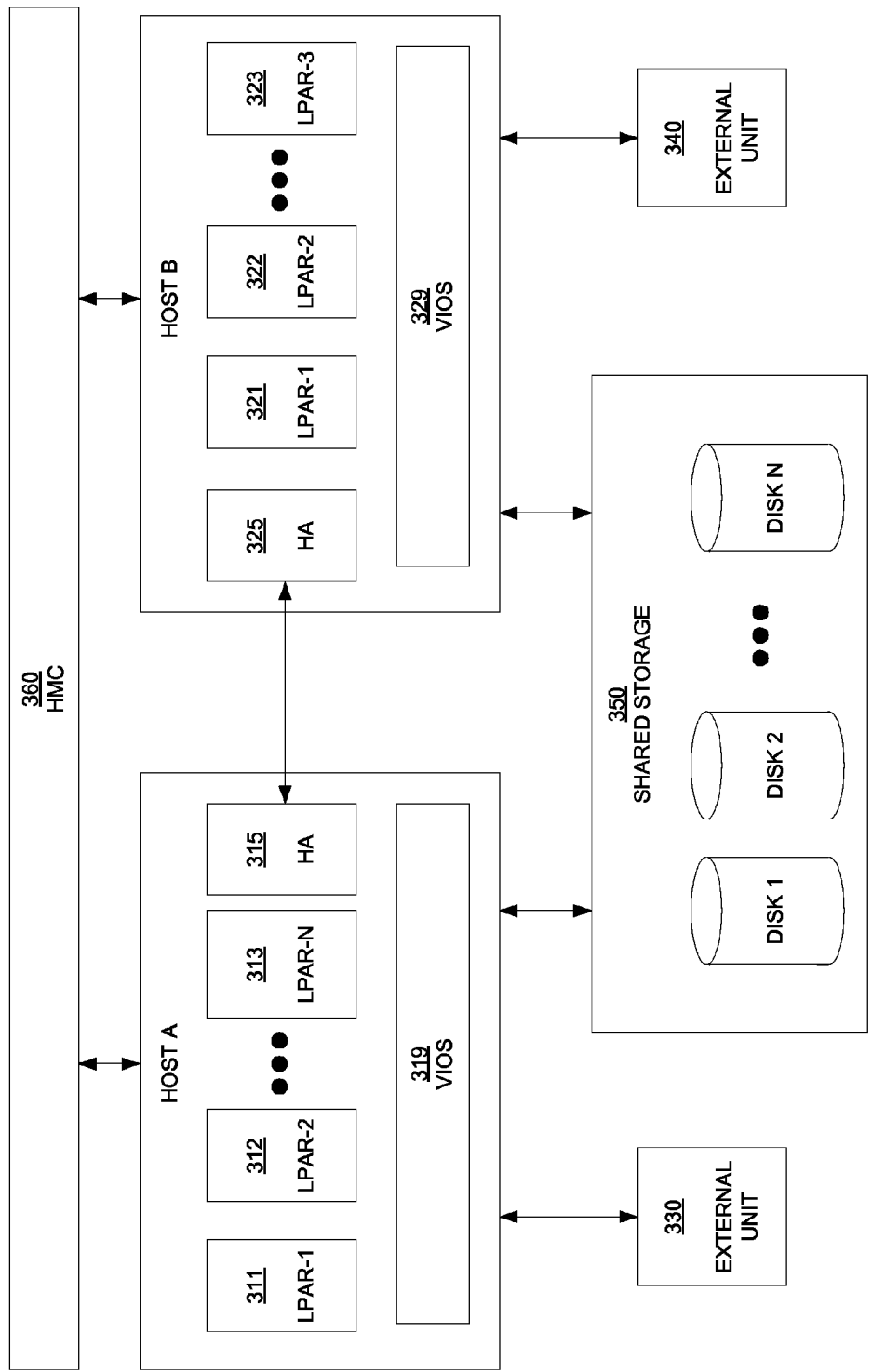
FIG. 3 is a block diagram of a cluster server environment including one or more host computing resources comprising one or more LPARs, in which LPARs are capable of being migrated from host to host, while maintaining LPAR availability under failover conditions, in accordance with one embodiment of the invention.

FIG. 3 is a block diagram of a cluster server environment 300 including one or more host systems or computing resources (hereinafter referred to as "host" or "host system") comprising one or more LPARs, in which LPARs are capable of being migrated from host to host, while maintaining LPAR availability under failover conditions, in accordance with one embodiment of the invention. The cluster server environment is implementable within the network architecture 200 illustrated in FIG. 2, in one embodiment.

As shown in FIG. 3, the cluster server environment 300 includes a first Host A and a second Host B, both of which are physical, computing resources. The hardware resources of each of the Hosts A and B are logically partitioned into one or more logical partitions (LPARs), wherein each LPAR is a virtual instance of a computing resource. For example, Host A is partitioned into LPAR-1 311, LPAR-2 312, and on up to LPAR-N 313. Also, Host B is partitioned into LPAR-1 321, LPAR-2 322, and on up to LPAR-N 323.

The LPARs in a given host are virtualized through a virtualization layer provided by the virtual input/output server (VIOS). In particular, the VIOS provides for virtualization of storage and network, and also facilitates communication between the virtual LPARs without using physical hardware. For instance, in one embodiment the VIOS includes a virtual SCSI adapter to facilitate the input/output (I/O) communication between the LPARs within that host system, and to facilitate communication to external devices through a physical SCSI adapter, such as, to a disk in shared storage 350 or to external units 330 and 340. Other embodiments are well suited to provide for the implementation of other virtualized communication devices depending on the operating environment used by the LPAR, such as, virtual Ethernet adapters, virtual fibre channel adapters, virtual serial adapters, etc. As shown in FIG. 3, the LPARs 311, 312, and 313 in Host A are virtualized through VIOS 319. Also, the LPARs 321, 322, and 323 in Host B are virtualized through VIOS 329.

Additionally, cluster server environment 300 includes a hardware management console (HMC) that is used to configure and control one or more of the host devices (e.g., Host A and Host B). Specially, HMC 360 is used as an interface to create and manage LPARs within a given host system. In some embodiments, the HMC 360 facilitates migration of LPARs from one host system to another host system with the cooperation of both host systems.

The HMC 360 is responsible for creating partition profiles that define the configuration for a given LPAR. For instance, the profile defines the system resources assigned to the logical partition (e.g., processor resources, memory resources, I/O resources, etc.), and includes information such as, the minimum and maximum amounts of physical system resources assigned to the logical partition. The HMC 360 manages the implementation of LPARs and their profiles throughout the cluster server network 300. However, HMC 360 is configured to provide for and facilitate migration of LPARs from one host to another, and to allow for failover of LPARs from one host to another.

Furthermore, each host system includes a cluster server module in a dedicated LPAR that implements cluster awareness between host systems. These cluster server modules are referred to as High Availability (HA) modules, and communicate with each other such that the HA modules can work together to provide for failover protocols and high availability of LPARs and their corresponding applications throughout the cluster server environment 300. As an example, Veritas Cluster server (VCS) manages a cluster of computing resources (e.g., LPARs) to be highly available on a cluster of physical and/or virtual machines. For instance, Host A includes HA 315 and Host B includes HA 325, wherein HA 315 of Host A is configured to communicate with HA 325 of Host B to provide for implementation of failover and high availability protocols. That is, through the implementation of HAs 315 and 325, LPARs in one host system are made available in another host system under failure conditions through the implementation of failover and/or high availability protocols.

In addition, cluster server environment 300 includes shared storage 350. In one implementation, shared storage includes one or more physical disks of storage, such as, disks 1, 2 . . . N. The disks in the shared storage 350 include memory resources for each of the LPARs throughout the cluster server environment 300. In addition, the disks in the shared storage 350 include the operating systems for each of the virtualized LPARs throughout the cluster server environment 300. In that manner, the operating systems of active instances LPARs existing on a failed host system can be revived through the use of failover protocols, such that LPARs can be brought up at the second host system. To make a disk available to a particular LPAR, that disk is assigned or mapped to a particular server virtual SCSI adapter of a corresponding VIOS. For instance, disk 1 in shared storage 350 may be assigned, mapped, or associated with LPAR-1 311 of Host A through appropriate mapping within VIOS 319.

Figure 4:
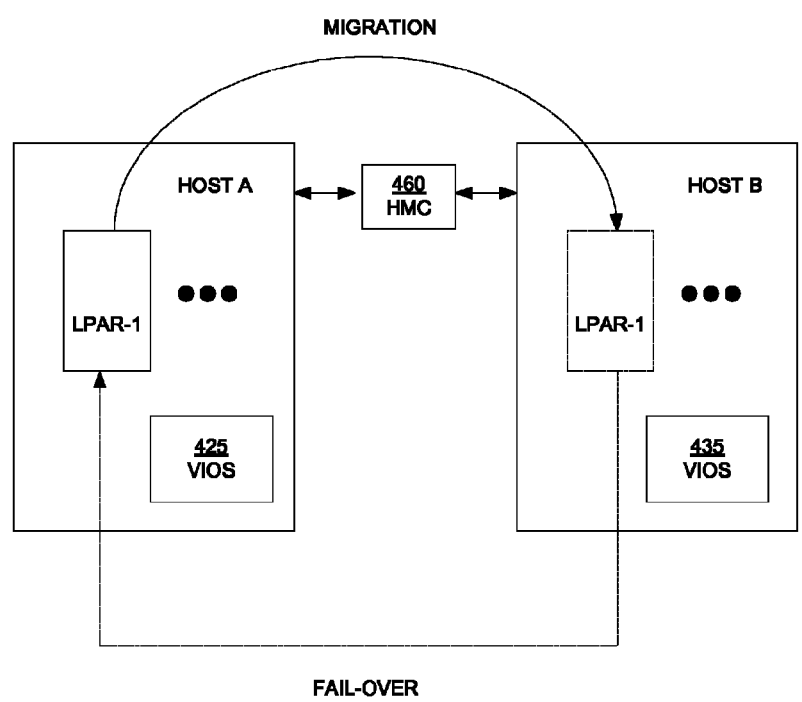
FIG. 4 is a data flow diagram depicting the migration of an LPAR from a first host to a second host, and the failover of the LPAR back to the first host, in accordance with one embodiment of the invention.

FIG. 4 is a data flow diagram 400 depicting the migration of an LPAR (e.g., LPAR-1) from a first host (e.g., Host A) to a second host (e.g., Host B), and the failover of the LPAR (e.g., LPAR-1) back to the first host in a cluster server environment, in accordance with one embodiment of the invention. In one embodiment, the migration and failover of LPAR-1 is implementable within the cluster server environment 300 of FIG. 3.

As shown in FIG. 4, Host A includes an active instance of LPAR-1. In addition, Host A includes VIOS 425 to facilitate communication between the LPARs of Host A as well as facilitating communication to external devices, such as, to resources provided in Host A. LPAR-1 is associated with a profile that is created through an HMC module 460.

Through the help of the HMC module 460, LPAR-1 present on Host A is migrated to Host B, using a migration protocol. The active instance of the LPAR-1 profile is also migrated to Host B. In particular, the HMC module 460 coordinates the migration of LPAR-1 with the cooperation of both Hosts A and B. In that manner, HMC module 460 allows a single instance of LPAR-1 to be active during migration between the two host computing resources.

Embodiments of the present invention provide for compatibility between the migration protocol and failover (and/or high availability) protocols. That is, after successful migration of LPAR-1 to Host B, in the case where LPAR-1 becomes faulty or fails, or Host B itself becomes faulty or fails, embodiments of the present invention are able to implement failover sequences and/or protocols to activate LPAR-1 back on Host A without the cooperation of both Host A and Host B, especially since Host B is possibly inactive. Implementation of failover and/or high availability protocols is facilitated through the corresponding HA modules (not shown) in each of the host systems.

Figure 5:
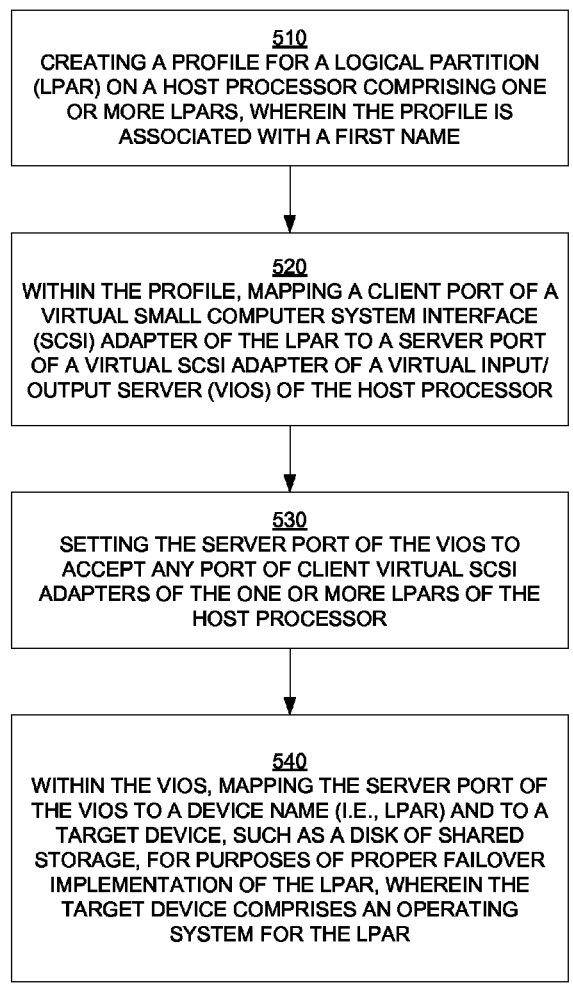
FIG. 5 is a flow diagram illustrating a method of LPAR migration, while maintaining LPAR availability under failover conditions, in accordance with one embodiment of the invention.

FIG. 5 is a flow diagram 500 illustrating a computer implemented method of LPAR migration, while maintaining LPAR availability under failover conditions, in accordance with one embodiment of the invention. In another embodiment, flow diagram 500 is implemented within a computer system including a processor and memory coupled to the processor and having stored therein instructions that, if executed by the computer system causes the system to execute a method for LPAR migration. In still another embodiment, instructions for performing the method are stored on a non-transitory computer-readable storage medium having computer-executable instructions for causing a computer system to perform a method for LPAR migration as outlined by flow diagram 500.

The operations of flow diagram 500 are implemented within the cluster server environment 300 of FIG. 3, and within the data flow diagram 400 of FIG. 4, in embodiments of the present invention. More particularly, the method of LPAR migration is implementable within the VIOS and HA modules of corresponding host devices, wherein the method allows for and is compatible with the implementation of failover protocols, in embodiments of the present invention.

At 510, the method includes creating a first profile for an LPAR that is active on a first host system. The host system includes one or more LPARs, and includes other components for facilitating the virtualization of the LPARs, such as, a VIOS. In some embodiments, compatibility of the migration protocol with a failover protocol is implemented beginning at a single host device through its configuration.

More particularly, at 520, within the first profile, the method includes mapping a client port of a virtual SCSI adapter of the LPAR to a server port of the virtual SCSI adapter of the VIOS coordinating virtualization of LPARS through the first host system. In that manner, the LPAR understands that it needs to communicate with a particular server port on the virtual SCSI adapter of the VIOS.

At 530, the server port of the VIOS is set to accept any port of the client virtual SCSI adapters of the one or more LPARS of the first host system. That is, the SCSI port is generically assigned to any of the LPARs, and is not assigned on a one-to-one basis. In one embodiment, the port is assigned to "any slot/any partition." In this manner, the mappings associated with server port of the virtual SCSI adapter of VIOS is not deleted through any migration protocol implemented by HMC because the SCSI port is generically assigned. On the other hand, when the server SCSI port of a VIOS was assigned to a client SCSI port of a LPAR in the VIOS, when that LPAR was migrated, that mapping information was automatically deleted, thereby preventing any failover protocol from failing that LPAR back to the present first host system without significant downtime, after the implementation of the failover protocol.

At 540, within the VIOS of the first host system, the method includes mapping the server port of the VIOS SCSI adapter to a device name (i.e., LPAR). In addition, the server port of the VIOS SCSI adapter is mapped to a target device, such as a disk that includes the operating system for the LPAR, wherein the disk is included within shared storage. Because the server port of the SCSI adapter in VIOS is set to accept any LPAR generically (e.g., any slot/any partition), the underlying mapping is also retained, instead of being erased, when migrating the LPAR to another host system (e.g., a second host system).

In addition, a backup profile to the first profile for the LPAR active on the first host system is also created. The backup profile also maps the corresponding client port of the virtual SCSI adapter of the LPAR to the corresponding server port of the virtual SCSI adapter of the VIOS coordinating virtualization of LPARS through the first host system. Also, the backup profile located on the first host system is mapped to the same disk in shared storage that includes the operating system for the LPAR. The backup profile is separately referenced from the first profile (e.g., different profile name) and is also located on the first host system. As such, the backup profile acts as a backup that is internal to the first host system.

Additionally, for purposes of failover, the first profile of the LPAR that is active on the first host system is also created on a second host system. This second profile of the LPAR that is located on the second host system is similarly referenced as the first profile on the first host system (e.g., same profile name). For instance, the second profile provides similar port to port SCSI adapter mapping, and is also mapped to the same disk in shared storage that contains the operating system for the underlying LPAR. As such, if the LPAR fails on the first host system, the LPAR can failover to the second host system using the second profile without cooperation between the first and second host systems.

Further, a backup profile to the second profile for the LPAR on the second host system is also created. The backup profile also maps the corresponding client port of the virtual SCSI adapter of the LPAR to the corresponding server port of the virtual SCSI adapter of the VIOS coordinating virtualization of LPARS through the second host system. The backup profile on the second host system is also mapped to the same disk in shared storage that contains the operating system for the underlying LPAR. The backup profile on the second host system is separately referenced than the second profile (e.g., different profile name) and is located on the second host system. As such, this backup profile acts as an internal backup to the second profile located on the second host system.

Figure 6A:
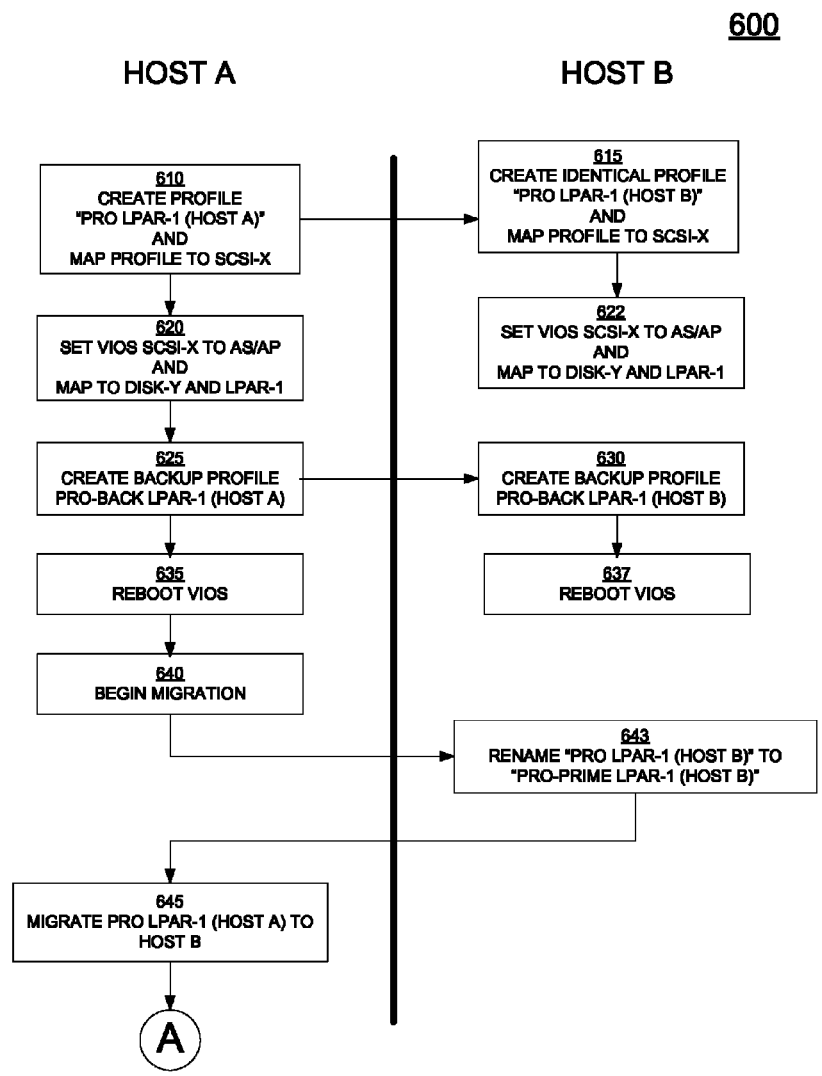
FIGS. 6A-B are flow diagrams illustrating a method of LPAR migration and failover, in which LPARs are capable of being migrated from host to host, while maintaining LPAR availability under failover conditions, in accordance with one embodiment of the invention.
Figure 6B:
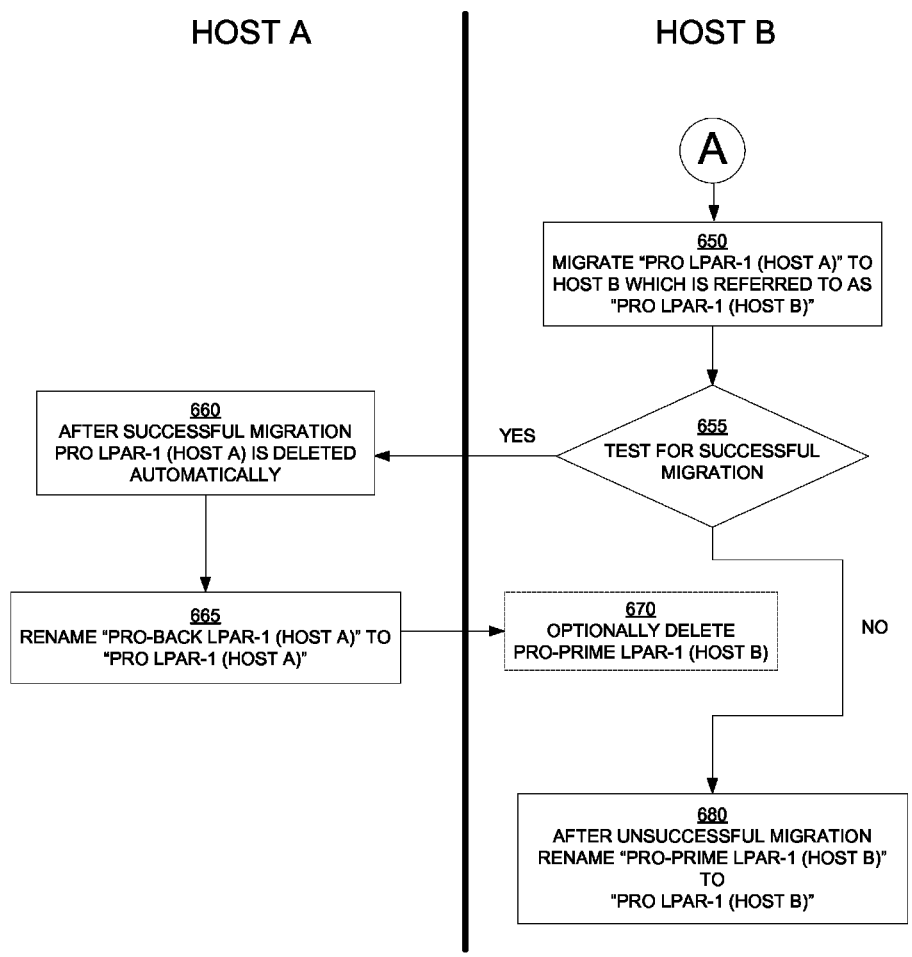

FIGS. 6A-B are illustrations of a flow diagram 600 illustrating a computer implemented method of LPAR migration and failover, in which LPARs are capable of being migrated from host to host, while maintaining LPAR availability under failover conditions, in accordance with one embodiment of the invention. Flow diagram 600 illustrates the operations performed when migrating an LPAR from a first host to a second host in order to ensure compatibility with failover protocols. In another embodiment, flow diagram 600 is implemented within a computer system including a processor and memory coupled to the processor and having stored therein instructions that, if executed by the computer system causes the system to execute the method for LPAR migration and failover. In still another embodiment, instructions for performing the method are stored on a non-transitory computer-readable storage medium having computer-executable instructions for causing a computer system to perform a method for LPAR migration and failover as outlined by flow diagram 600. The operations of flow diagram 600 are implemented within the cluster server environment 300 of FIG. 3, and within the data flow diagram 400 of FIG. 4, in embodiments of the present invention. More particularly, the method of LPAR migration is implementable within the VIOS and HA modules of corresponding host devices, wherein the method allows for and is compatible with the implementation of failover protocols, in embodiments of the present invention.

Throughout flow diagram 600, profile names are referenced. Any particular designation given to a profile name is used for illustration only, and is not intended to limit the naming of the profile that that designation. The references are instead intended to show the distinction between names of profiles residing on different host devices.

At 610, a profile is created for an LPAR-1 that is active on a first host system ("Host A"). The profile is referred to as "PRO LPAR-1 (HOST A)," wherein for convention throughout this Application the name is defined as "PRO LPAR-1" and "(HOST A)" indicates that the profile "PRO LPAR-1" is stored in Host A. In addition, from the perspective of LPAR-1, the profile consists of Client Virtual SCSI adapter which is mapped to a particular server port (e.g., port X) of the virtual SCSI adapter of the corresponding VIOS that provides for virtualization of LPARs within Host A. For instance, the profile "PRO LPAR-1 (HOST A)" is created with the help of an HMC module.

At 620, the corresponding server port X of the SCSI adapter that is associated with LPAR-1 is set to accept any generic port of SCSI adapters of an LPAR in the VIOS on Host A. For instance, when LPAR is managed within a cluster environment (such as, that managed by VCS), port X of the server virtual SCSI adapter is set to "any slot/any partition in the VIOS. In addition, server port X of the virtual SCSI adapter of VIOS for Host A is mapped to the correct client SCSI adapter in LPAR-1. Also, server port X in the virtual SCSI adapter for VIOS in Host A is also mapped to the proper disk in shared storage, wherein the disk contains the operating system for LPAR-1. In this manner, by generically setting server port X to accept any slot of any LPAR, when the LPAR in Host A is migrated to Host B, the underlying mappings for server port X of the virtual SCSI adapter in the VIOS of Host A is not deleted.

For purposes of cluster awareness and high availability, at 615 the profile for the LPAR-1 is also created on a second host system (Host B). In particular, a second profile is created for LPAR-1 at a second host system (e.g., Host B) for purposes of implementing a failover protocol. The profile is referred to as "PRO LPAR-1 (HOST B)," wherein the profile name is defined as "PRO LPAR-1" and "(HOST B)" indicates that the profile "PRO LPAR-1" is stored in Host B. As defined, the profiles for LPAR stored in Hosts A and B are similarly referenced. Also, both LPAR-1 profiles are similar, such that the information contained in "PRO LPAR-1 (HOST A)" is similar to the information in "PRO LPAR-1 (HOST B)." For instance, the profile "PRO LPAR-1 (HOST B)" is created with the help of an HMC module. The profile for LPAR-1 in Host B is not active. In addition, from the perspective of LPAR-1, the profile consists of Client Virtual SCSI adapter which is mapped to a particular server port (e.g., port X) of the virtual SCSI adapter of the corresponding VIOS that provides for virtualization of LPARs within Host A.

At 622, in Host B server port X of the SCSI adapter that is associated with an inactive LPAR-1 is set to accept any generic client port of SCSI adapters of an LPAR in VIOS on Host B. For instance, when LPAR is managed within a cluster environment (such as, that managed by VCS), server port X of the virtual SCSI adapter is set to "any slot/any partition" in the VIOS. In addition, server port X of the virtual SCSI adapter of VIOS for Host B is mapped to the correct client SCSI adapter in the inactive LPAR-1. Also, server port X in the virtual SCSI adapter for VIOS in Host B is also mapped to the proper disk in shared storage, wherein the disk contains the operating system for LPAR-1. As such, the second profile for LPAR-1 created on Host B is mapped to the disk in shared storage that contains the operating system for the underlying LPAR-1.

At 625, a backup profile for LPAR-1 is created at Host A. This backup profile acts as an internal backup within Host A for purposes of failover after migration. The profile is referred to as "PRO-BACK LPAR-1 (HOST A)." For instance, the backup profile is created with the help of the HMC module. As defined, the profile name (PRO-BACK LPAR-1) of the back-up profile is not the same as the originally named profile for LPAR-1 (PRO LPAR-1). The backup profile on Host A is also mapped to the same disk in shared storage that contains the operating system for the underlying LPAR. The backup profile for LPAR-1 in Host A is not active.

At 630, a backup profile for LPAR-1 is created at Host B. This backup profile acts as an internal backup within Host B for purposes of failover after migration. The profile is referred to as "PRO-BACK LPAR-1 (HOST B)." For instance, the backup profile is created with the help of the HMC module. As defined, the name (PRO-BACK LPAR-1) of the back-up profile is not the same as the originally named profile for LPAR-1 (PRO LPAR-1) on Host B. The backup profile on Host B is also mapped to the same disk in shared storage that contains the operating system for the underlying LPAR. The backup profile for LPAR-1 in Host B is not active.

At 635, the VIOS of Host A is rebooted. This is performed so that the configuration settings are instantiated before any future migration and/or failover sequence is performed. In that manner, whenever any future migration and/or failover sequence is performed after the configuration has been set, then there is no associated downtime experienced by Host A. In addition, the VIOS of Host B is rebooted at 637. This is performed so that the configuration settings are instantiated before any future migration and/or failover sequence is performed. In that manner, whenever any future migration and/or failover sequence is performed after the configuration has been set, then there is no associated downtime experienced by Host B.

At 640, a migration sequence begins. For instance, the HMC module of a cluster server environment is able to perform a migration of the LPAR-1 on Host A to Host B. A typical scenario that implements LPAR migration is when the computing resources in Host A are undergoing maintenance. In that case, the LPARs in Host A are migrated to Host B, such that the applications supported by those LPARs are still available.

Additionally, at Host B, at 643 the profile for LPAR-1 created for purposes of cluster awareness is renamed. In that manner, the profiles stored for LPAR-1 on Host A are separately referenced than the profiles for LPAR-1 stored on Host B. For instance, the profile "PRO LPAR-1 (HOST B)" is renamed to "PRO-PRIME LPAR-1 (HOST B)," such that the profiles for LPAR-1 stored on Host A and Host B are separately referenced. This renaming of the profile is accomplished so that the migration sequence will occur, as HMC may not migrate LPAR and its associated profile from Host A to Host B if Host B already has a similarly referenced profile (e.g., same name). That is, in the cluster server environment, during migration, validation of the migration protocol (e.g., implementation of LPM validation) fails if it finds the profile with the same name on the destination host server (e.g., Host B). The renamed profile "PRO-PRIME LPAR-1 (HOST B) acts as a further backup profile to LPAR-1 in case the migration fails.

At 645, LPAR-1 is migrated from Host A to Host B. More particularly, the information continued within the profile for LPAR-1, PRO LPAR-1 (HOST A), is migrated to Host B.

Continuing to FIG. 6B, through connector A of flow diagram 600, at 650, profile for LPAR-1 is migrated from Host A to Host B. The new profile that is stored on Host B for the active instance of LPAR-1 is referred to as "PRO LPAR-1 (HOST B)." For instance, during the migration sequence, the HMC module is used to create the new profile "PRO LPAR-1 (HOST B)" in Host B.

At 655, a test is performed in association with Host B to determine if the migration of LPAR-1 from Host A to Host B was successful. If there was successful migration of LPAR-1, flow diagram 600 proceeds to 660. On the other hand, if migration of LPAR-1 was unsuccessful, flow diagram 500 proceeds to 680.

For instance, after successful migration, at 660, the instance of LPAR-1 and its profiles (e.g., "PRO LPAR-1 (HOST A)) are automatically deleted from Host A. In addition, at 665, the back-up profile created at HOST A is renamed, for purposes of cluster awareness and failover. That is, the backup profile for LPAR-1 is restored on Host A and again referred to as "PRO LPAR-1 (HOST A)." For instance, the renaming is performed using the HMC module. The profile "PRO-LPAR-1 (HOST A)" is not active.

At 670, the backup profile created on HOST B, "PRO-PRIME LPAR-1 (HOST B) is optionally deleted, in one implementation. In another implementation, the backup profile is maintained for purposes of providing a failover after migration profile to LPAR-1.

On the other hand, if the migration of LPAR-1 was unsuccessful, LPAR-1 on Host A still needs to be active. In particular, at 680 after unsuccessful migration, the backup profile on Host B "PRO-PRIME LPAR-1 (HOST B) is renamed back to "PRO LPAR-1 (HOST B)", for purposes of cluster awareness. As such, in case of failover, LPAR-1 is able to failover to Host B. In one embodiment, this is accomplished via VCS scripts by registering to the migrate events.

Thus, according to embodiments of the present disclosure, systems and methods are described in which a LPAR failover feature in cluster server protocols (e.g., VCS) is compatible with other LPAR migration protocols to ensure proper implementation of failover sequences after successful migration.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer implemented method for migration, comprising:
   creating a first profile for a logical partition (LPAR) on a first host system comprising one or more LPARs, wherein said first profile is associated with a first name;
   within said first profile, mapping a client port of a virtual small computer system interface (SCSI) adapter of said LPAR to a server port of a virtual SCSI adapter of a virtual input/output server (VIOS) of said first host system;
   setting said server port of said VIOS to accept any port of virtual SCSI adapters of said one or more LPARs of said first host system; and
   within said VIOS, mapping said server port of said VIOS to said LPAR and to a target device for purposes of proper failover implementation of said first profile, wherein said target device comprises an operating system for said LPAR.

2. The computer implemented method of claim 1, wherein said setting said server port comprises:
   setting said server port of said VIOS to "any slot/any partition."

3. The computer implemented method of claim 1, further comprising:
   rebooting said VIOS.

4. The computer implemented method of claim 1, further comprising:
   creating a second profile for said LPAR at a second host system comprising one or more LPARs for purposes of backing up said LPAR; and
   naming said second profile with said first name so that said first and second profiles are similarly referenced.

5. The computer implemented method of claim 4, further comprising:
   creating a backup profile of said first profile at said first host system, wherein said backup profile is associated with a second name;
   renaming said second profile at said second host system so that said first profile and said second profile are separately referenced; and
   migrating said first profile having said first name to said second host system.

6. The computer implemented method of claim 5, further comprising:
   determining whether said first profile was successfully migrated;
   if successful, deleting said first profile of said first LPAR at said first host system automatically; and
   renaming said backup profile of said first LPAR back to said first name for purposes of proper failover implementation of said first profile.

7. The computer implemented method of claim 6, further comprising:
   deleting said second profile at said second host system.

8. The computer implemented method of claim 5, further comprising:

determining whether said first profile was successfully migrated;

if not successful, renaming said second profile of said first LPAR back to said first name for purposes of proper failover implementation of said first profile.

9. A computer system, comprising:

a processor; and memory coupled to said processor and having stored therein instructions that, if executed by said computer system, cause said computer system to execute a method for migration, comprising:

creating a first profile for a logical partition (LPAR) on a first host system comprising one or more LPARs, wherein said first profile is associated with a first name;

within said first profile, mapping a client port of a virtual small computer system interface (SCSI) adapter of said LPAR to a server port of a virtual SCSI adapter of a virtual input/output server (VIOS) of said first host system;

setting said server port of said VIOS to accept any port of virtual SCSI adapters of said one or more LPARs of said first host system; and within said VIOS, mapping said server port of said VIOS to said LPAR and to a target device for purposes of proper failover implementation of said first profile, wherein said target device comprises an operating system for said LPAR.

10. The computer system of claim 9, wherein said method further comprises:

rebooting said VIOS.

11. The computer system of claim 9, wherein said method further comprises:

creating a second profile for said LPAR at a second host system comprising one or more LPARs for purposes of backing up said LPAR;

naming said second profile with said first name so that said first and second profiles are similarly referenced;

creating a backup profile of said first profile at said first host system, wherein said backup profile is associated with a second name;

renaming said second profile at said second host system so that said first profile and said second profile are separately referenced; and migrating said first profile having said first name to said second host system.

12. The computer system of claim 11, wherein said method further comprises:

determining whether said first profile was successfully migrated;

if successful, deleting said first profile of said first LPAR at said first host system; and renaming said backup profile of said first LPAR back to said first name for purposes of proper failover implementation of said first profile.

13. A non-transitory computer-readable storage medium having computer-executable instructions for causing a computer system to perform a method for migration, comprising:

creating a first profile for a logical partition (LPAR) of a first host system comprising one or more LPARs, wherein said first profile is associated with a first name;

within said first profile, mapping a client port of a virtual small computer system interface (SCSI) adapter of said LPAR to a server port of a virtual SCSI adapter of a virtual input/output server (VIOS) of said first host system;

setting said server port of said VIOS to accept any port of virtual SCSI adapters of said one or more LPARs of said first host system; and within said VIOS, mapping said server port of said VIOS to said LPAR and to a target device for purposes of proper failover implementation of said first profile, wherein said target device comprises an operating system for said LPAR.

14. The non-transitory computer-readable storage medium of claim 13, wherein said setting said server port in said method comprises:

setting said server port of said VIOS to "any slot/any partition."

15. The non-transitory computer-readable storage medium of claim 13, wherein said method further comprises:

rebooting said VIOS.

16. The non-transitory computer-readable storage medium of claim 13, wherein said method further comprises:

creating a second profile for said LPAR at a second host system comprising one or more LPARs for purposes of backing up said LPAR; and naming said second profile with said first name so that said first and second profiles are similarly referenced.

17. The non-transitory computer-readable storage medium of claim 16, wherein said method further comprises:

creating a backup profile of said first profile at said first host system, wherein said backup profile is associated with a second name;

renaming said second profile at said second host system so that said first profile and said second profile are separately referenced; and migrating said first profile having said first name to said second host system.

18. The non-transitory computer-readable storage medium of claim 17, wherein said method further comprises:

determining whether said first profile was successfully migrated;

if successful, deleting said first profile of said first LPAR at said first host system; and renaming said backup profile of said first LPAR back to said first name for purposes of proper failover implementation of said first profile.

19. The non-transitory computer-readable storage medium of claim 18, wherein said method further comprises:

deleting said second profile at said second host system.

20. The non-transitory computer-readable storage medium of claim 17, wherein said method further comprises:

determining whether said first profile was successfully migrated;

if not successful, removing said backup profile of said first LPAR at said first host system; and renaming said second profile of said first LPAR back to said first name for purposes of proper failover implementation of said first profile.

* * * * *